Dec. 25, 1951 V. H. PRUITT Re. 23,447

WATERING DEVICE

Original Filed Oct. 22, 1946

Inventor

VIRGIL H. PRUITT

By Merwin, Fenwick & Lawrence

Attorneys

Reissued Dec. 25, 1951 Re. 23,447

UNITED STATES PATENT OFFICE 23,447

WATERING DEVICE

Virgil H. Pruitt, Snow Hill, Md.

Original No. 2,512,839, dated June 27, 1950, Serial No. 704,890, October 22, 1946. Application for reissue May 9, 1951, Serial No. 225,430

11 Claims. (Cl. 137—68)

Matter enclosed in heavy brackets [ ] appears in the original patent but forms no part of this reissue specification; matter printed in italics indicates the additions made by reissue.

This invention relates to a watering device and more particularly to an automatic valve primarily for use with a type of watering trough in which one end of the trough rests on the ground or any other suitable support and in which the opposite end of the trough is connected with the valve so that the weight of the water in the trough automatically operates the valve and regulates the water level.

On very large chicken or poultry farms, it is extremely important that a very reliable watering device be provided which will always maintain an adequate water supply. It is highly important that these devices be as foolproof as possible in order that nothing will happen to the valve which might permit the watering trough to overflow or to permit the valve to open in the event that *the* trough gets knocked over.

Heretofore, devices have been provided in which the valves are operated by the weight of the water in the troughs but in the event the wire on which the one end of the trough is suspended breaks, the valve will open and cause the area in the vicinity of the watering trough to be flooded. Also, the same thing happens in the event that the poultry breaks or interferes with the valve control mechanism. Also, it is desirable to clean these watering troughs at least once a day and in the prior devices before the weight of the water and trough could be taken off of the valve operating mechanism at the time of the cleaning operation, it was first necessary to operate a thumb screw to screw down the valve control mechanism to close the valve. Then when the trough was clean and ready to be put back in operation, it was necessary to unscrew the first thumb screw and operate a second thumb screw to hold the valve open while the trough was being filled with water. Alternatively, instead of the second thumb screw the valve might be held open while the trough is filled with water. On large poultry ranches where there are a very large number of these watering troughs in use it will be readily apparent that a large number of man-hours are consumed in tending to the watering devices. In accordance with the present invention, an automatic water valve is provided in which the valve automatically closes under the influence of pressure of the water. The invention also provides an automatic gravity latch mechanism for holding the valve open to fill the chicken trough, the latch mechanism being responsive to gravity to revert to inoperative [locking] position as soon as the weight of the water in the watering trough becomes sufficient to close the valve. [Hereafter] *Thereafter* the valve operating mechanism is enabled to return to normal operation to maintain the proper water level in the watering trough.

Accordingly, the primary object of the invention is to provide a watering device [in which an automatic water valve] including a special automatic water valve which automatically shuts off the water supply in the event the end of the trough hanging from the valve mechanism becomes disassociated therefrom or in the event the trough is turned over and the water is spilled or the opposite end of the trough becomes so displaced as to prevent the normal operation of the valve control mechanism.

Another object of the invention is to provide an automatic valve in the association referred to above in which the valve is responsive to the weight of the water in the trough for controlling the level of the water therein and in which the source of water supply is automatically cut off, in the event the valve control mechanism becomes inoperative, or the weight of the water and trough become disassociated with the valve control mechanism.

*Watering troughs such as usually employed for poultry are of rather light construction, being commonly fabricated from sheet metal. They are therefore easily overturned or disarranged. Moreover, they frequently develop leaks. If the valve were so constructed as to be opened by the weight of the empty trough, and the trough should be accidentally upset or turned sidewise, while still hanging from the valve mechanism, the water would keep on flowing and the adjacent area would be flooded. The same would be true if the trough should develop a leak, so that it did not fill up. Consequently, it is highly desirable to so construct the mechanism that the weight of the empty trough is not sufficient to open the valve. When so constructed, it is necessary to move the valve to open position by hand in order to start the water flowing, when the empty trough is placed in position.*

A further object *of the invention* is *therefore* to provide an automatic valve in the association described, including an automatic gravity latch for holding the valve in an intermediate open position to start filling the trough and which will revert to inoperative locking position as soon as the weight of the water in the trough becomes sufficient to operate the valve control mechanism.

Other and further objects will become readily apparent from the following description when considered in connection with the accompanying drawings, illustrating an embodiment of the invention, and in which.

Figure 3:
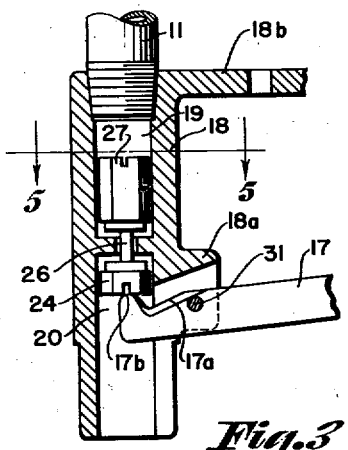
Figure 3 is an enlarged partial elevational cross section showing the position of the valve members when the valve control mechanism is in the locked position shown in Figure 2.
Figure 5:
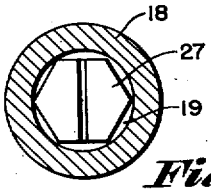
Figure 4:
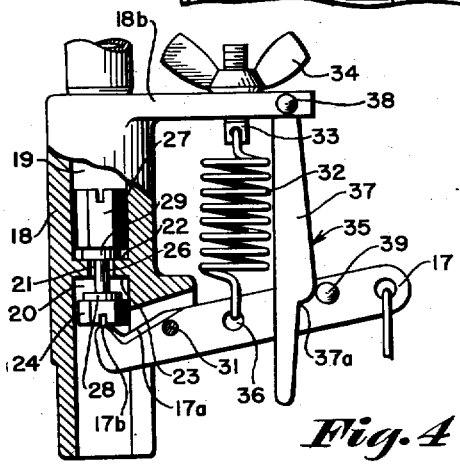

Figure 4 is an enlarged partial elevational cross section showing in solid lines the position of the valve member closing the valve when the gravity latch is in the inoperative locking position and the valve control mechanism is not held down by the weight of water in the trough; and Figure 5 is a cross sectional plan view of Figure 3 on the line 5—5 showing the hexagonal shape of the valve members.

In the illustration of the invention represented in the drawings, the invention is shown as applied to a chicken watering trough of the type in which one end rests on the ground or other suitable support and the opposite end is suspended by a suitable wire or chain to an arm of the control mechanism of the automatic valve for controlling the supply of water to the trough. The valve assembly comprises fundamentally a structure having two valve orifices *or seats* in series and valves for controlling each of the orifices in which one valve is normally adapted to be closed under the influence of the pressure of the water source and the other valve is adapted to be closed in the opposite direction by the valve control mechanism and against the pressure of the water source.

Referring specifically to the drawings, the valve assembly 10 is operably associated between the water supply pipe 11 and the watering receptacle or trough 12. If desired a suitable manually operated valve 13 may also be provided in the water supply pipe 11 to shut off the water supply in the event it is desired to change the valve assembly 10. A suitable flexible tube or hose 14 is connected to the lower end of the valve assembly 10 to direct the water into the watering trough 12 with a minimum of splashing. The end of the watering trough adjacent the valve assembly 10 is suspended by a suitable wire or chain 16 from a valve actuating arm 17. The opposite end of the trough 12 is adapted to rest on the ground or any suitable base such as a wooden or concrete platform.

Fundamentally the valve assembly 10 comprises the valve housing 18 having what in effect is a two-way valve which closes communication through the valve assembly in either of the two extreme positions and *which has* an intermediate open position, the purpose of which will be readily apparent as description proceeds. The valve housing 18 is provided with two aligned bores 19 and 20 extending inwardly from the opposite ends of the valve housing 18 and which are separated by a restriction 21 which serves as a partition between the two bores. The opposite sides 22 and 23, respectively, of the restriction or partition 21 serve as valve seats. In the particular embodiment shown, the lower valve member 24 is in the form of a head to bolt 26 which screw-threadedly engages an elongated nut 27 which serves as the upper valve member for the valve seat 22. The lower valve *member* 24 is provided with a recess for receiving a suitable sealing gasket 28 while the upper valve member 27 is similarly provided with a sealing gasket 29. The length of the bolt 26 is such that when the nut 27 is screwed thereon sufficiently to effect tight engagement, the valve members 24 and 27 will be sufficiently spaced so that when one valve member is against its associated seat, the other valve member will be displaced from its associated seat. Therefore, it will be apparent that there is an intermediate position in which both of the valves will be open to provide communication between the bores 19 and 20. The valve actuating lever arm 17 is pivotally connected at 31 to suitable bosses 18ᵃ which extend laterally from the sides of the valve housing 18. The inner end of the valve operating lever 17 is notched at 17ᵃ and the sides of the notch are inclined at angles of 45° for the purpose of reducing the splashing of the water as it emerges through the lower valve orifice. The extreme inner end of the valve operating lever 17 terminates in a head 17ᵇ which is adapted to engage the valve member 24 to move both of the valve members in unison. Since the valve assembly 10 is usually mounted in the position shown in the drawings, it will be readily apparent that during normal operation under the influence of gravity and the pressure of the source of water, the valve member 27 will close the upper orifice. Therefore the primary purpose of the valve control lever 17 is to move the valve members 24 and 27 upwardly to close the lower orifice. By this arrangement it would be readily apparent that if, for any reason, the weight of the trough 12 is taken off of the arm 17, or if the pivotal connection 31 should break, the valve member [17] *27* will automatically close and on the other hand, water in the trough 12 will open the valve 27 to admit water to the trough *until the valve 24 closes.*

For the purpose of regulating the amount of the water in the trough 12, biasing means is supplied to the lever arm 17 to oppose the weight of the trough and the water therein. To this end the housing 18 is provided with an arm 18ᵇ on which a suitable tension spring 32 is adjustably anchored by means of a bolt 33 having wing nut 34. The lower end of the spring 32 is hooked in a hole 36 in the valve control lever arm 17. By adjusting the thumb nut 34 the tension on the spring 32 can be so adjusted that the valve 24 will close when the water in the trough 12 reaches any desired height.

Figure 1:
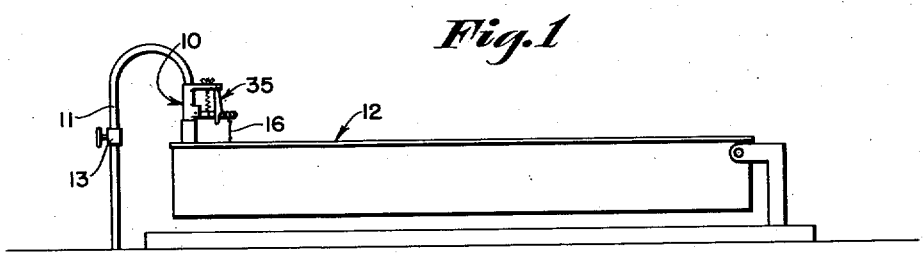
Figure 1 is an elevational view showing the complete assembly of a watering device made in accordance with the present invention.
Figure 2:
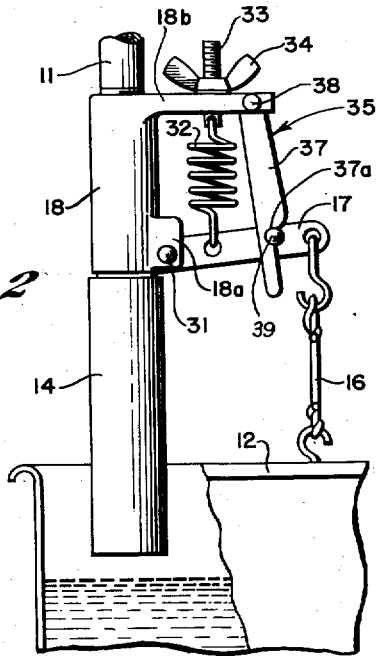
Figure 2 is an enlarged partial elevational view with a portion of the trough cut away and showing the gravity latch holding the valve in the intermediate open position.

When it is desired to clean the trough 12, it is always necessary to remove the weight of the water from the valve control lever arm 17. Obviously, from the description above, the valve member 27 will immediately close under the influence of the pressure of the water source. Therefore if the trough is cleaned and the empty trough is hung on the arm 17, the weight of the empty trough will not be sufficient to open the valve member 27 to fill the trough. For this reason, *the arm 17 has to be moved by hand to open the valve 27, and* the present invention provides a novel gravity latch mechanism 35 which can be used to lock the lever arm 17 in an intermediate position whereby both valve members 24 and 27 are in open position to start the water flowing into the trough 12. The latch is so arranged that as soon as the weight of the water in the trough 12 becomes sufficient to close the valve 24, the gravity latch automatically unlocks and thereafter the valve control arm 17 can control the water level in the trough 12 in normal manner. To this end the gravity latch comprises a member 37 which is loosely pivoted at 38 on the outer end of arm 18ᵃ which is carried by the housing 18. The latch member 37 is notched at 37ᵃ and is adapted to engage a suitable pin 39 which is carried by the valve control arm 17 between the latter's pivotal connection at 31 to the valve housing and the point at which the wire 16 is connected to the lever 17. The position of the pivot point at 38 is so related to the position of the *center of gravity of the latch and of the* headed pin 39 that when the housing 18 is arranged vertically, as shown in the drawings, the latch member 37 will hang free of the pin 39 and will not be engaged thereby. Therefore during normal operation, the valve actuating lever arm 17 is free to move up and down under the influence of the weight of the water in the trough 12 and the spring 32. If for any reason the water is spilled out of the trough 12, if the wire 16 should break or if the pivotal connection 31 should break, the valve member 27 will close under the influence of gravity and the pressure of the source of the water supply. It will be apparent that after cleaning the trough or, if for any reason the trough is empty and it is desired to fill it, when *the lever 17 is depressed by hand and* the lower end of the latch member 37 is *manually* moved to the right, as shown in Figure 2, the notch 37ª will engage the pin 39 and hold the two valve members 24 and 27 in intermediate position so that bores 19 and 20 are in communication with each other. As soon as the weight of the water in the trough is sufficient to overcome the tension of the spring 32, the valve-control lever arm *17* will be pulled down and the pin 39 will be disengaged from the notch 37ª. At this time the latch member 37, under the influence of gravity, will swing to the left and hang straight down so that the notch 37ª will not thereafter engage the headed pin 39. The valve actuating mechanism will at this time return to its normal operation for controlling the water level in the trough 12 without any interference from the gravity latch. The gravity operated latch is a very important feature in that it saves considerable time in cleaning and tending to a large number of automatic valves.

The automatic valve control arm latch has been referred to above as a gravity latch but instead of relying on gravity it will be readily apparent that a suitable spring could be used for resiliently urging clockwise rotation of the latch member 37 about the pivot point 38. With such a construction when the arm 17 is moved downwardly so that the notch 37ª would be disengaged from the pin 39, the lower end of the latch member 37 would move to the left out of the way of the pin 39 so that the latch member 37 would become inoperative thereafter and the valve control mechanism could revert to the automatic operation for controlling the water level in the trough 12.

Although the invention has been described in considerable detail, it will be apparent to those skilled in the art that many variations are possible without departing from the inventive concept. It is therefore desired that the invention not be limted except insofar as *is* [it] made necessary by the prior art and by the appended claims.

I claim:

1. In combination, a receptacle, such as a watering trough, a source of water under pressure, valve means having a plurality of valve orifices arranged in series for controlling the flow of water from said source to said receptacle, a valve member associated with each of said orifices, valve control means operably associated with said receptacle and responsive to the weight of the water therein to open one of said orifices and to close another of said orifices to control flow of water through both of said orifices, and means normally biasing said valve control means to enable said first valve to move to closed position said valve control means having a horizontally extending arm, a gravity latch comprising a latch member for locking said arm in a fixed position with both of said valves in open position, the center of gravity of said latch member being so disposed with respect to its point of [suspension] *support* as to be responsive to gravity for returning to inoperative position when said arm is moved away from its [normally biased] *locked* position.

[2. In combination, an automatic water valve, a receptacle such as a watering trough, said valve comprising a valve housing having a bore, valve seats in series in said bore, valve members operably associated with the respective valve seats, means operably associated between said valve members whereby the latter are caused to move in unison in such relation that when one valve is in closed position the other will be in open position, means for operably engaging one of said valve members for moving said valve members for opening one of said valves, said latter means being normally biased to permit said one valve member to close, and means for locking said valve control means in an intermediate position so that water can flow through said valve means to fill said receptacle, said locking means being responsive to gravity for returning to inoperative position when said valve control means is operated by the weight of the water in said receptacle.]

3. In combination, a receptacle such as a watering trough, a source of water under pressure, valve means having a plurality of valve orifices arranged in series for controlling the flow of water from said source to said receptacle, a valve member for closing each of said orifices, valve control means operably associated with said receptacle and responsive to the weight of the water therein to open one of said orifices and to close another of said orifices to control the flow of water through both of said orifices, means normally biasing said valve control means to a position to enable [said first valve to move to closed position,] *the closing of said first orifice by the associated valve member,* and means for locking said valve control means in an intermediate position to hold both valves in open position, said locking means [being responsive to] *comprising a member adapted to engage said valve control means and movable laterally by* gravity for returning to inoperative position when said valve control means is operated by the weight of the water in said receptacle.

4. In an automatic water valve assembly for a watering trough and the like, *an elongated housing,* two associated valves in series, *in said housing* one of said valves adapted normally to close in one direction under the influence of pressure from a source of water, *connected to one end of said housing,* the other of said valves adapted to close in the opposite direction, means operably associated between said valves to cause said valves to operate in unison so that when [one] *the first* is closed the [other] *second* will be open, valve control means for operating said valves to prevent *at times* said [one] *first* valve from closing under the influence of pressure from said source of water, *said valve control means comprising a lever pivoted to said housing and extending into the open end of said housing*

*opposite the end adapted to be connected to the source of water pressure, said valve control means being capable of occupying either one of two extreme positions or an intermediate position,* and [locking] means for locking said valve control means in [an] *its* intermediate position to hold said [one] *first* valve open against the pressure of said source of water, *said second valve also being open to permit water to flow through both valves and escape from the end of the housing into which said lever extends,* said locking means [being responsive to] *comprising a member adapted, when in operative position, to engage said valve control means and movable laterally by* gravity for returning to inoperative position when said valve control means is moved away from said intermediate position.

[5. In combination, a receptacle such as a watering trough, a source of water under pressure, valve means for controlling the flow of water from said source to said receptacle comprising two associated valves in series, one of said valves adapted normally to close in one direction under the influence of pressure from a source of water, the other of said valves adapted to close in the opposite direction, means operably associated between said valves to cause said valves to operate in unison so that when one is closed the other will be open, valve control means for operating said valves, means operably associated between said receptacle and said valve control means whereby the latter is operated by the weight of water in said receptacle to prevent said one valve from closing under the influence of pressure from said source of water and to close the other of said valves, and locking means for locking said valve control means in an intermediate position to hold said one valve open against the pressure of said source of water, said locking means being responsive to gravity for returning to inoperative position when said valve control means is moved away from said intermediate position.]

6. In an automatic watering system, a water valve assembly, a receptacle, such as a watering trough, means operably associated between said receptacle and said valve means for controlling the flow of water into said receptacle, said valve assembly comprising a casing having a passage therethrough and a laterally extending arm, a central partition in said passage having a central opening, valve seats on the opposite sides of said partition around said opening, a valve for each of said valve seats separated by a valve stem extending through said central opening in said partition, an operating lever pivotally connected to said casing and generally parallel to and in generally vertical alignment with said laterally extending arm projecting from said casing, the inner end of said lever adapted to engage one of said valves, means for normally biasing said lever to enable one of said valves to move to closed position on one of said valve seats, a gravity latch comprising a latch member pivotally depending from said first arm, said latch member adapted to engage an abutment on said operating lever to hold said operating lever in an intermediate position against the action of said biasing means where both of said valves are in unseated position, the center of gravity of said latch member being so disposed with respect to its point of pivotal suspension that it will be responsive to gravity for returning to inoperative position when said operating arm is moved away from latched position.

7. In combination, a valve assembly, a receptacle, such as a watering trough, means operably associated between said receptacle and said valve for controlling the operation of said valve in response to the weight of the water or liquid in said receptacle, said valve assembly comprising a casing having a passage therethrough and a laterally extending arm projecting therefrom, a central partition in said passage having a central opening, valve seats on the opposite sides of said partition around said opening, a valve for each of said valve seats, a valve stem extending through said central opening in said partition and interposed between said valves to space the latter, an operating lever pivotally connected to said casing and generally parallel to and in generally vertical alignment with said laterally extending arm, the inner end of said lever adapted to engage one of said valves, means for normally biasing said lever to such a position as to enable one of said valves to move to closed position on one of said valve seats, a gravity latch member disposed between said arm and said lever and pivoted to one arm and adapted to engage the other to hold said lever in an intermediate position where both of said valves are in unseated position, the center of gravity of said latch being so disposed relative to its pivotal connection and to its engaged position as to return to the inoperative latch position in response to gravity when said operating lever is moved away from said intermediate position.

8. In an automatic watering system, a water valve assembly, a receptacle, such as a watering trough, means operably associated between said receptacle and said valve means for controlling the flow of water into said receptacle, said valve assembly comprising a casing having a passage therethrough and a laterally extending arm, a central partition in said passage having a central opening, valve seats on the opposite sides of said partition around said opening, a valve for each of said valve seats separated by a valve stem extending through said central opening in said partition, an operating lever pivotally connected to said casing and generally parallel to and in general vertical alignment to said laterally extending arm projecting from said casing, the inner end of said lever adapted to engage one of said valves, means for normally biasing said lever to enable one of said valves to move to closed position on one of said valve seats, a latch member operably associated between said laterally extending arm on said casing and said lever arm adapted to selectively hold said valve control arm in an intermediate position to hold both of said valves open simultaneously.

*9. In combination, a receptacle such as a watering trough, a source of water under pressure, valve means having a plurality of valve orifices arranged in series for controlling the flow of water from said source to said receptacle, a valve member for closing each of said orifices, valve control means operatively associated with said receptacle and responsive to the weight of the water therein to open one of said orifices and to close another of said orifices to control the flow of water through both of said orifices, means normally biasing said valve control means to a position to enable the closing of said first orifice by the associated valve member, the weight of said receptacle, when empty, being insufficient to overcome said biasing means, said valve control*

*means being movable by hand to an intermediate position to hold the valve members in such position that water may flow through both of said orifices into said receptacle, and means for locking said valve control means in said intermediate position against the force of said biasing means, said locking means comprising a member adapted to engage said valve control means and movable by gravity for returning to inoperative position when said valve control means is operated by the weight of sufficient water in said receptacle.*

*10. In combination, a receptacle such as a watering trough, a source of water under pressure, valve means comprising a housing having a plurality of valve orifices arranged in series therein for controlling the flow of water from said source to said receptacle, a valve member for closing each of said orifices, valve control means comprising an arm pivoted to said housing operatively associated with said receptacle and responsive to the weight of water therein to open one of said orifices and to close another of said orifices to control the flow of water through both of said orifices, means normally biasing said valve control means to a position to enable the closing of said first orifice by the associated valve member, said valve control means being movable by hand an an intermediate position to hold the valve members in such position that water may flow through both of said orifices into said receptacle, a second arm rigid with said housing and projecting therefrom generally parallel to and spaced from said first arm, and means for locking said valve control means in said intermediate position against the force of said biasing means, said locking means comprising a member disposed between said arms, said member being supported on one arm and adapted to engage the other, and being movable laterally by gravity to disengage the latter when said valve control means is operated by the weight of sufficient water in said receptacle.*

*11. In combination, a receptacle such as a watering trough, a source of water under pressure, valve means comprising a housing having a plurality of valve orifices arranged in series therein for controlling the flow of water from said source to said receptacle, a valve member for closing each of said orifices, a laterally extending arm rigid with said housing, valve control means comprising a lever pivoted to said housing, and projecting therefrom generally parallel to and spaced from said arm, said valve control means being operatively associated with said receptacle and responsive to the weight of water therein to open one of said orifices and to close another of said orifices to control the flow of water through both of said orifices, means normally biasing said control means to a position to enable the closing of said first orifice by the associated valve member, said biasing means comprising a spring anchored to and extending between said arm and lever, said valve control means being movable by hand to an intermediate position against the tension of said spring to hold the valve members in such position that water may flow through both of said orifices into said receptacle, and means for locking said valve control means in said intermediate position against the force of said biasing means, said locking means comprising a member adapted to engage said lever, and movable by gravity to disengage the same when said valve control means is operated by the weight of sufficient water in said receptacle.*

*12. In an automatic water valve assembly for a watering trough and the like, two associated valves in series, one of said valves adapted normally to close in one direction under the influence of pressure from a source of water, the other of said valves adapted to close in the opposite direction, means to cause said valves to operate in unison so that when one is closed the other will be open, valve control means for operating said valves to prevent at times said one valve from closing under the influence of pressure from said source of water, said valve control means being capable of occupying either one of two extreme positions or an intermediate position, and means for locking said valve control means in an intermediate position to hold said one valve open against the pressure of said source of water, said other valve also being open to permit the passage of water through both valves, said locking means comprising a member movable laterally by gravity to inoperative position when said valve control means is moved away from said intermediate position.*

*13. In combination, a receptacle such as a watering trough, a valve housing adapted to be connected to a source of water under pressure, valve means in said housing for governing the flow of water from said source to said receptacle, said valve means being movable to either one of two extreme closed positions in which flow of water is cut off, and to an intermediate open position in which flow of water is permitted, valve control means operatively associated with said valve means and with said receptacle, means biasing said valve control means to a position to enable said valve means to move to one extreme closed position under the influence of pressure from said source of water, said valve control means being movable in response to the weight of water in said receptacle against the force of said biasing means to shift said valve means against the water pressure to its other extreme closed position, the weight of said receptacle, when empty, being insufficient to move said valve control means against the combined force of said biasing means and of the water pressure holding said valve means in its first mentioned extreme closed position, said valve control means being movable by hand to shift said valve means to its intermediate open position, and a latch device manually shiftable to operative position for temporarily locking said valve control means in such intermediate position while water flows into said receptacle, said latch device being constructed to return automatically to inoperative position, so as to release said valve control means, when a sufficient weight of water has accumulated in said receptacle.*

VIRGIL H. PRUITT.

REFERENCES CITED

The following references are of record in the file of this patent or the original patent:

UNITED STATES PATENTS

| Number | Name | Date |
|---|---|---|
| 1,055,673 | Smedberg | Mar. 11, 1913 |
| 1,415,178 | Imschweiler | May 9, 1922 |
| 1,513,038 | Fortier | Oct. 28, 1924 |
| 2,278,655 | James | Apr. 7, 1942 |